US011227116B2

United States Patent
Cai

(10) Patent No.: US 11,227,116 B2
(45) Date of Patent: Jan. 18, 2022

(54) TRANSLATION DEVICE, TRANSLATION METHOD, AND PROGRAM

(71) Applicant: Panasonic Intellectual Property Management Co., Ltd., Osaka (JP)

(72) Inventor: He Cai, Aichi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 21 days.

(21) Appl. No.: 16/892,371

(22) Filed: Jun. 4, 2020

(65) Prior Publication Data

US 2020/0302124 A1    Sep. 24, 2020

Related U.S. Application Data

(63) Continuation of application No. PCT/JP2018/040637, filed on Nov. 1, 2018.

(51) Int. Cl.
*G06F 40/295* (2020.01)
*G06F 40/253* (2020.01)
(Continued)

(52) U.S. Cl.
CPC .......... *G06F 40/295* (2020.01); *G06F 40/20* (2020.01); *G06F 40/253* (2020.01);
(Continued)

(58) Field of Classification Search
CPC ...... G06F 40/295; G06F 40/20; G06F 40/253; G06F 40/40; G06F 40/289; G06F 40/242; G06F 40/268
(Continued)

(56) References Cited

U.S. PATENT DOCUMENTS 4,482,981 A * 11/1984 Morimoto ............... G06F 40/58
704/3
6,385,568 B1 * 5/2002 Brandon ............... G06F 40/247
704/7
(Continued)

FOREIGN PATENT DOCUMENTS

| JP | 63-211067 | 9/1988 |
|---|---|---|
| JP | 3-148764 | 6/1991 |

(Continued)

OTHER PUBLICATIONS

International Search Report of PCT application No. PCT/JP2018/040637 dated Feb. 5, 2019.

*Primary Examiner* — Edwin S Leland, III
(74) *Attorney, Agent, or Firm* — McDermott Will and Emery LLP

(57) ABSTRACT

A translation device includes: a controller that extracts a proper noun candidate from an original sentence, generates a translation word of the proper noun candidate in a second language, generates a second translated sentence by translating the original sentence into the second language based on the proper noun candidate and the translation word of the proper noun candidate, and generates a second reverse-translated sentence by translating the second translated sentence into the first language based on the proper noun candidate and the translation word of the proper noun candidate; a display that displays the first reverse-translated sentence and the second reverse-translated sentence; and an operation unit that receives a user operation of selecting one of the first reverse-translated sentence and the second reverse-translated sentence. The controller displays one of the first translated sentence and the second translated sentence on the display as a translated sentence of the original sentence according to the selection of the user.

13 Claims, 14 Drawing Sheets

(51) Int. Cl.
  *G06F 40/40* (2020.01)
  *G06F 40/289* (2020.01)
  *G06F 40/20* (2020.01)
  *G06F 40/268* (2020.01)
  *G06F 40/242* (2020.01)

(52) U.S. Cl.
  CPC ............ *G06F 40/289* (2020.01); *G06F 40/40* (2020.01); *G06F 40/242* (2020.01); *G06F 40/268* (2020.01)

(58) Field of Classification Search
  USPC .................................................... 704/3
  See application file for complete search history.

(56) References Cited

U.S. PATENT DOCUMENTS

| | | | | |
|---|---|---|---|---|
| 9,015,030 | B2* | 4/2015 | Hunter | G06F 40/58 704/3 |
| 2002/0065647 | A1* | 5/2002 | Hatori | G06F 40/55 704/2 |
| 2002/0161569 | A1* | 10/2002 | Itoh | G06F 40/242 704/2 |
| 2002/0169592 | A1* | 11/2002 | Aityan | G06F 40/58 704/2 |
| 2008/0021698 | A1 | 1/2008 | Itoh et al. | |
| 2016/0092437 | A1* | 3/2016 | Endo | G06F 40/58 704/4 |
| 2016/0350290 | A1* | 12/2016 | Fujiwara | G06N 20/00 |
| 2017/0068661 | A1* | 3/2017 | Yu | G06F 40/169 |
| 2017/0371866 | A1* | 12/2017 | Eck | G06F 40/49 |
| 2018/0101522 | A1 | 4/2018 | Fujiwara et al. | |
| 2018/0314689 | A1* | 11/2018 | Wang | G10L 15/07 |
| 2018/0329898 | A1 | 11/2018 | Fujiwara et al. | |
| 2019/0213261 | A1* | 7/2019 | Mochida | G06F 40/51 |
| 2020/0302124 | A1* | 9/2020 | Cai | G06F 40/289 |

FOREIGN PATENT DOCUMENTS

| | | |
|---|---|---|
| JP | 9-101960 | 4/1997 |
| JP | 2002-259375 | 9/2002 |
| JP | 2008-225963 | 9/2008 |
| JP | 2015-170093 | 9/2015 |
| JP | 2016-218995 | 12/2016 |

* cited by examiner

FIG. 3

Spoken sentence: 「近畿経済産業局はあちらです。」 ST1

Extraction model
- Phrase structure analysis
- Word structure analysis

Proper noun candidates: 「近畿経済産業局」 N1

Proper noun dictionary

| Class | Japanese | English |
|---|---|---|
| Place name | 天神社 (N2) | Ten Temple |
| Place name | □□ | ■■ |
| Person's name | ○○○ | ●●● |
| ⋮ | ⋮ | ⋮ |

| Provisional registration information |||
|---|---|---|
| Class | Japanese | English |
| Person's name | ○○○ | ●●●● |
| Place name | △△△△ | ▲▲▲▲▲ |
| Place name | 近畿経済産業局 | Kinki Economy Industry Bureau |

| | Alternative word dictionary (N3) ||
|---|---|---|
| Class | Japanese | English |
| Place name | 東京駅 | Tokyo Station |
| Food | バナナ | Banana |
| ⋮ | ⋮ | ⋮ |

| Replacement information ||
|---|---|
| Before replacement (N2) | After replacement (N3) |
| 天神社 | 東京駅 |

FIG. 13

Proper noun candidate : 「近畿経済産業局」 N1

Analysis result : 「近畿」 N11  「経済」 N12  「産業」 N13  「局」 N14

Translation : 「Kinki」 「Economy」 「Industry」 「Bureau」

Translation word of proper noun candidate : 「Kinki Economy Industry Bureau」

FIG. 14
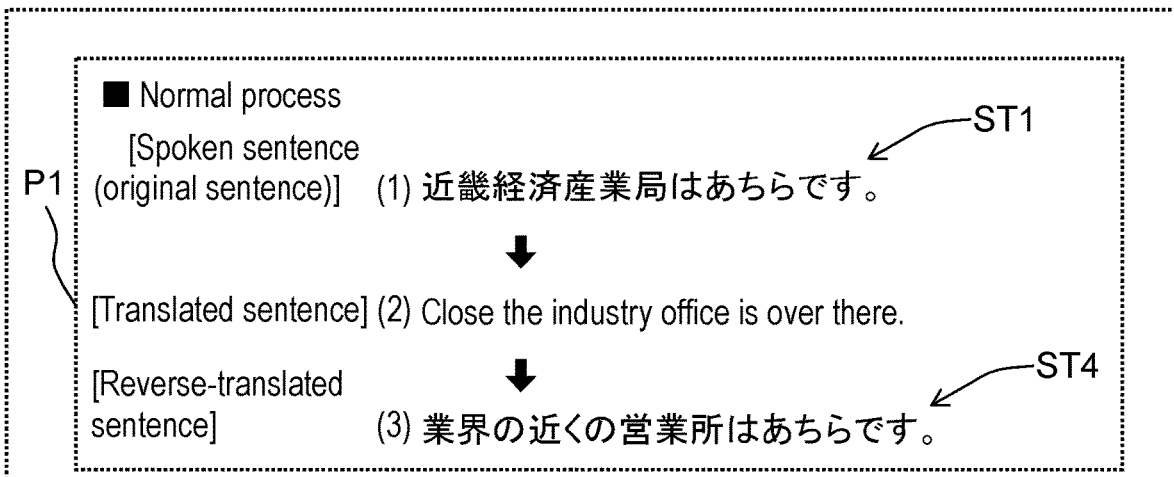
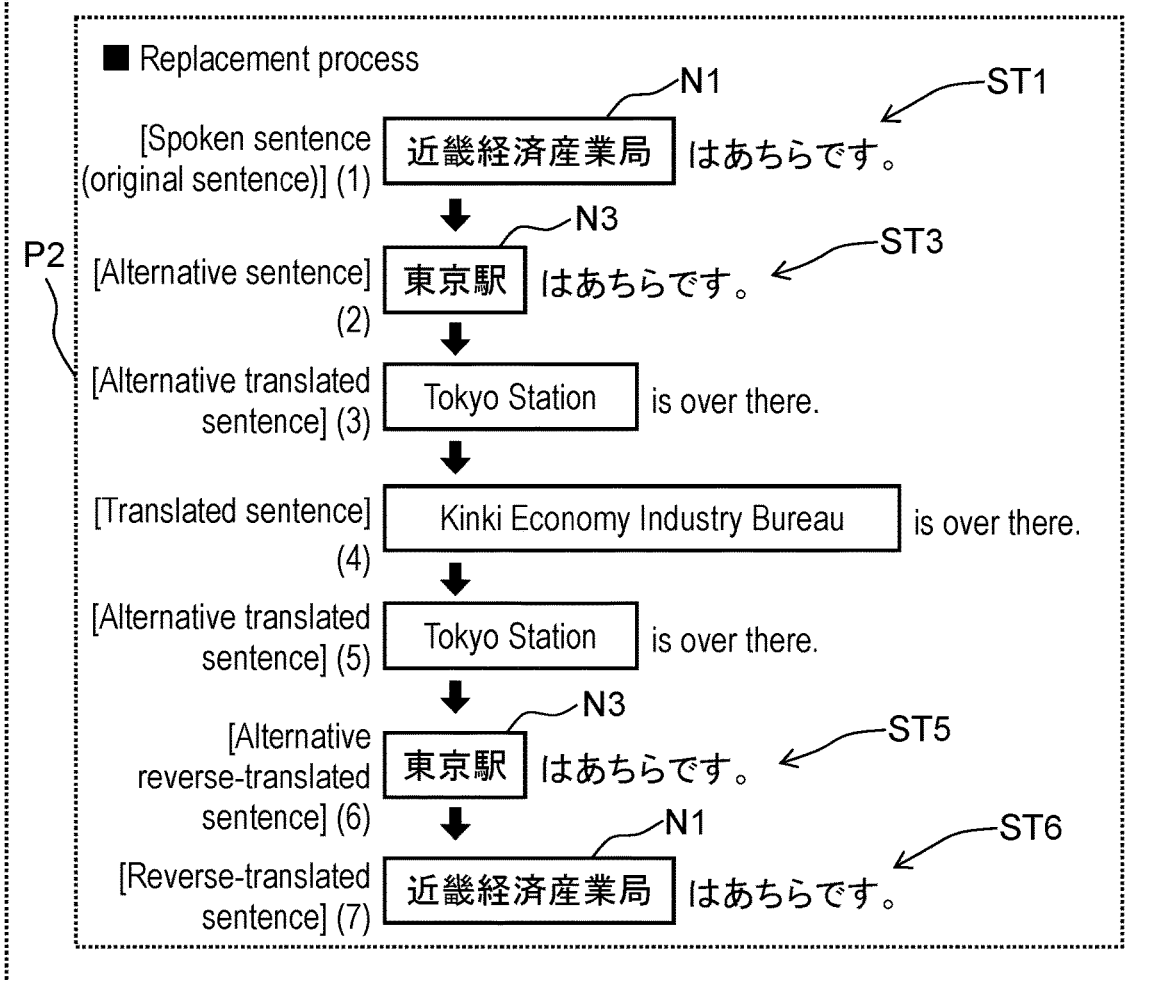

TRANSLATION DEVICE, TRANSLATION METHOD, AND PROGRAM

TECHNICAL FIELD

The present disclosure relates to a translation device, a translation method, and a program for translating a text input in one language into another language.

BACKGROUND ART

PTL 1 discloses an unknown word extraction device that extracts an unknown word from a translated sentence. This unknown word extraction device translates a text in a first language into a second language to generate a translated sentence, retranslates the generated translated sentence from the second language to the first language, and extracts an unknown word based on the re-translated sentence. Thereby, even when an unknown word cannot be extracted from the translated sentence, the unknown word can be appropriately extracted.

CITATION LIST

Patent Literature

PTL 1: Unexamined Japanese Patent Publication No. 2015-170093 A

SUMMARY

The present disclosure provides a translation device, a translation method, and a program that improve the convenience of registration of proper nouns.

A translation device according to the present disclosure includes an input unit that receives an input of an original sentence in a first language, and a controller. The controller acquires a first translated sentence generated by translating the original sentence into a second language and a first reverse-translated sentence generated by translating the first translated sentence into the first language. The controller extracts a proper noun candidate from the original sentence, generates a translation word of the proper noun candidate in a second language, generates a second translated sentence by translating the original sentence into the second language based on the proper noun candidate and the translation word of the proper noun candidate, and generates a second reverse-translated sentence by translating the second translated sentence into the first language based on the proper noun candidate and the translation word of the proper noun candidate. Further, the translation device includes a display that displays a first reverse-translated sentence and a second reverse-translated sentence, and an operation unit that receives a user operation of selecting one of the first reverse-translated sentence and the second reverse-translated sentence. The controller displays one of the first translated sentence and the second translated sentence on the display as a translated sentence of the original sentence according to the selection of the user.

These general and specific aspects may be implemented by a system, a method, a computer program, and combinations thereof.

According to the translation device, the translation method, and the program of the present disclosure, the convenience of registering proper nouns is improved. For example, a user can easily register a proper noun to be registered by approving (selecting) or rejecting (non-selecting) a reverse-translated sentence including a translation word of the proper noun generated by the translation device without manually inputting the proper noun.

BRIEF DESCRIPTION OF DRAWINGS

FIG. 3 is a diagram for describing an extraction model.

FIG. 4 is a diagram for describing a proper noun dictionary.

FIG. 5 is a diagram for describing provisional registration information.

FIG. 6 is a diagram for describing an alternative word dictionary.

FIG. 7 is a diagram for describing replacement information.

FIG. 13 is a diagram for describing generation of a translation word of a proper noun candidate.

FIG. 14 is a diagram for describing comparison between the normal process and the replacement process in the provisional registration process.

DESCRIPTION OF EMBODIMENT

Knowledge Underlying the Present Disclosure

If an original sentence contains a proper noun, the original sentence may not be translated correctly. In order to prevent the translation from failing, it is conceivable that a user registers a proper noun and its translation word in a translation device. In this case, the user needs to manually input the proper noun. However, it is difficult for the user to grasp an unregistered proper noun and to efficiently input only a proper noun to be registered. For example, if a user who speaks a first language cannot understand a translated sentence in a second language, the user cannot determine whether the proper noun is correctly translated even by checking the translated sentence. In this case, it is difficult for the user to determine whether the registration of the proper noun is necessary. Further, even if the user who speaks the first language can understand the translated sentence in the second language, it is difficult to accurately determine whether the cause of the translation failure is the presence or absence of the registration of a proper noun. Therefore, also in this case, it is difficult for the user to accurately determine whether the registration of the proper noun is necessary. Thus, conventionally, an unregistered proper noun could not be registered efficiently.

The translation device according to the present disclosure makes it possible to efficiently register an unregistered proper noun. Specifically, the translation device of the present disclosure extracts a proper noun candidate (unregistered proper noun) from the original sentence, generates a translation word of the extracted proper noun candidate, and generates provisional registration information. The translation device generates a translated sentence and reverse translation using the provisional registration information and generates a translated sentence and a reverse-translated sentence without using the provisional registration information, and displays both the reverse-translated sentences. Thus, the user can easily determine whether the registration of the proper noun candidate is necessary by comparing the two displayed reverse-translated sentences, and can confirm the translation word of the proper noun candidate. Further, the translation device formally registers the provisional registration information based on a user's operation of selecting a reverse-translated sentence. That is, the translation device registers the proper noun candidate as a proper noun. Therefore, according to the translation device of the present disclosure, a user can easily register a proper noun by approving (selecting) a reverse-translated sentence generated by the translation device, without manually inputting a proper noun to be registered and its translation word.

Exemplary Embodiment

Figure 1:
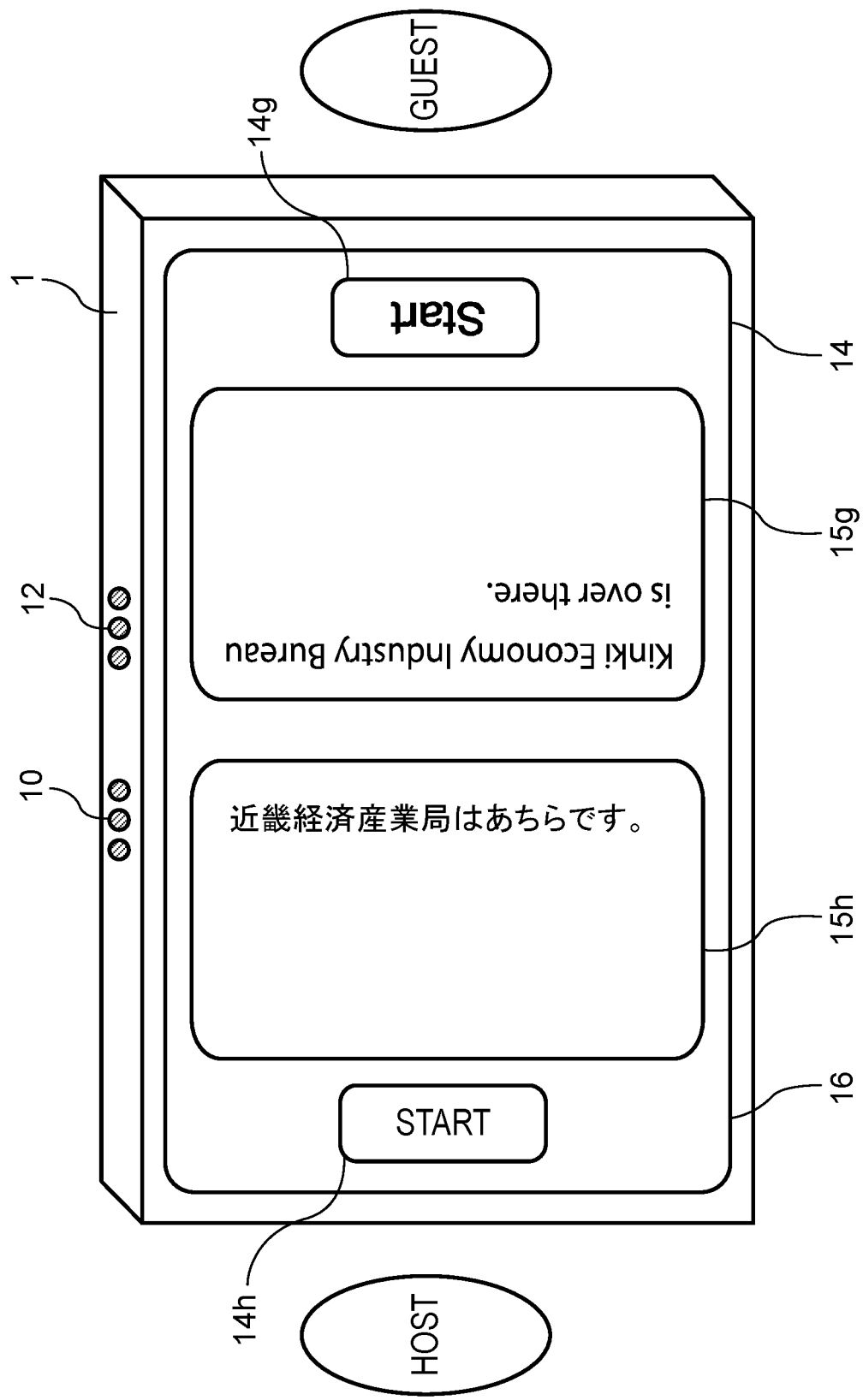
FIG. 1 is a diagram showing an appearance of a translation device.

An exemplary embodiment will be described below with reference to drawings.
1. Configuration
1-1. Appearance of Translation Device FIG. 1 is a diagram showing an appearance of a translation device according to the present exemplary embodiment. Translation device 1 shown in FIG. 1 is, for example, a tablet-type translation device, and is a translation device that translates a conversation between two users using different languages. That is, translation device 1 can perform translation from the first language to the second language and translation from the second language to the first language. For example, the first language is Japanese and the second language is English. Hereinafter, the present exemplary embodiment will be described on the assumption that a host who speaks Japanese (for example, a guide) and a guest who speaks English (for example, a traveler) translate a face-to-face conversation through translation device 1.

Translation device 1 includes microphone 10, speaker 12, display 14, and touch panel 16. Microphone 10 and speaker 12 are disposed, for example, near an opening on a side surface of translation device 1. Display 14 and touch panel 16 are disposed on a main surface of translation device 1. Speech icon 14$h$ and display area 15$h$ are disposed in an area on a host side, which is one side in a longitudinal direction of display 14. Speech icon 14$g$ and display area 15$g$ are displayed in an area on a guest side, which is the other side in the longitudinal direction of display 14. The user operates speech icons 14$h$, 14$g$ by touch operation.

Figure 2:
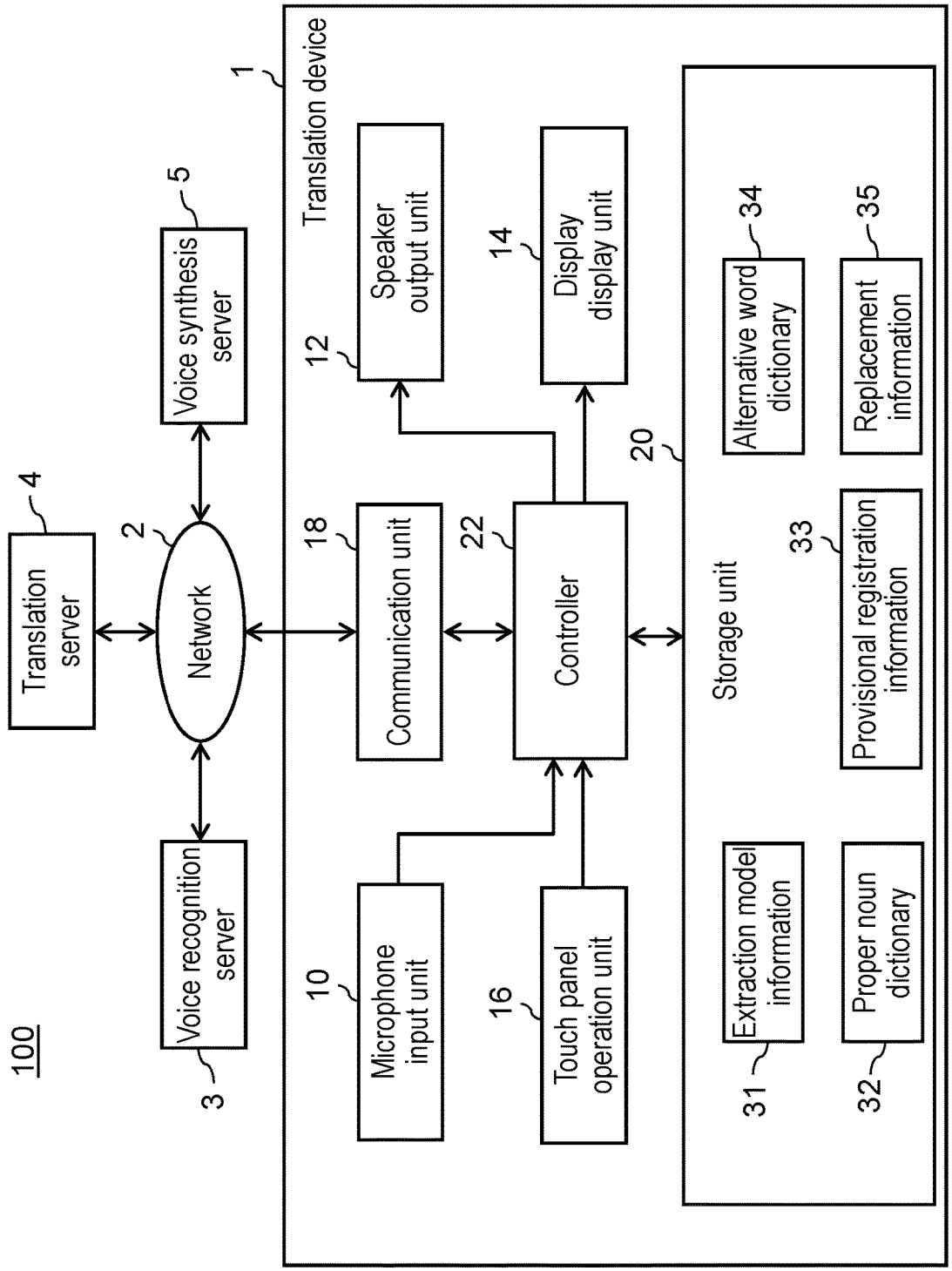
FIG. 2 is a block diagram showing an electrical configuration of a translation system.

Speech icon 14$h$ is an operation icon for the host to specify a start time and an end time of the speech of the host when the host speaks, that is, when the speech in Japanese (first language) is input to translation device 1. Speech icon 14$g$ is an operation icon for the guest to specify a start time and an end time of the speech of the guest when the guest speaks, that is, when the speech in English (second language) is input. Display areas 15$h$, 15$g$ are areas for displaying a spoken sentence, a translated sentence, a reverse-translated sentence, and the like as a character string.
1-2. Configuration of Translation Device and Server FIG. 2 is a block diagram showing an electrical configuration of the translation system according to the present exemplary embodiment. Translation system 100 of the present disclosure includes translation device 1, voice recognition server 3, translation server 4, and voice synthesis server 5 shown in FIG. 1. Translation device 1 performs data communication with each of voice recognition server 3, translation server 4, and voice synthesis server 5 via network 2 such as the Internet.

Voice recognition server 3 receives digital voice data from translation device 1 via network 2, voice-recognizes the received digital voice data, and generates text data of a spoken sentence (character string voice recognition data).

Translation server 4 is equipped with a translation engine having a translation function from Japanese to English and from English to Japanese. Translation server 4 receives the text data of the spoken sentence from translation device 1 via network 2, and translates the received text data of the spoken sentence to generate text data (character string translated data) of the translated sentence. Further, translation server 4 receives the text data of the translated sentence from translation device 1 via network 2, reverse-translates the received text data of the translated sentence, and generates text data of the reverse-translated sentence (character string reverse-translated data). Translation server 4 is an example of an external device that has a translation function from a first language to a second language and a translation function from a second language to a first language.

Voice synthesis server 5 is a server that receives text data of a translated sentence from translation device 1 via network 2, and voice-synthesizes the received text data of the translated sentence to generate a voice signal.

Translation device 1 includes communication unit 18, storage unit 20, and controller 22 in addition to microphone 10, speaker 12, display 14, and touch panel 16.

Microphone 10 is a device that converts voice into digital voice data. Specifically, microphone 10 converts voice into a voice signal (an analog electric signal), and further converts the voice signal into digital voice data using an AD converter. Microphone 10 is an example of an input unit that inputs a speech (voice) or a spoken sentence (text) to translation device 1.

Communication unit 18 is a communication module that performs data communication with voice recognition server 3, translation server 4, and voice synthesis server 5 via network 2 according to a communication system such as Bluetooth (registered trademark), Wi-Fi (registered trademark), 3G, Long Term Evolution (LTE) (registered trademark), and IEEE802.11.

Storage unit 20 is a recording medium including a flash memory, a ferroelectric memory, a hard disk drive (HDD), a solid state disk (SSD), a random access memory (RAM), a combination thereof, or the like. Storage unit 20 stores digital voice data, text data of a spoken sentence, text data of a translated sentence, and text data of a reverse-translated sentence. Further, storage unit 20 stores various programs for controller 22.

Further, in the present exemplary embodiment, storage unit 20 stores extraction model information 31, proper noun dictionary 32, provisional registration information 33, alternative word dictionary 34, and replacement information 35.

Extraction model information 31 is information indicating an extraction model for extracting a proper noun from an original sentence. Proper noun dictionary 32 is information that associates a proper noun in a first language with a translation word of the proper noun in a second language. Provisional registration information 33 is information that associates a proper noun candidate in the first language with a translation word of the proper noun candidate in the second language. In this description, a proper noun that is not registered in proper noun dictionary 32 is referred to as a "proper noun candidate". Alternative word dictionary 34 is information including an alternative word that is a term used in place of a proper noun or a proper noun candidate during translation. Replacement information 35 is information indicating the correspondence between the term before replacement and the term after replacement.

Controller 22 includes a central processing unit (CPU), a microprocessor unit (MPU), or the like, and controls the overall operation of translation device 1 by executing various programs stored in storage unit 20. Controller 22 achieves a predetermined function by reading data and programs stored in storage unit 20 and performing various arithmetic processes. In the present exemplary embodiment, the function of controller 22 is achieved by cooperation between hardware and software. Further, controller 22 may be achieved only by a hardware circuit specially designed to achieve a predetermined function. That is, controller 22 can be configured by not only the CPU, MPU but also a digital signal processor (DSP), a field programmable gate array (FPGA), an application-specific integrated circuit (ASIC), or the like.

Speaker 12 is a device that converts an electric signal into voice. Speaker 12 outputs voice based on a voice signal (electric signal) from controller 22. Speaker 12 is an example of an output unit that outputs a translation result voice or text to the outside.

Display 14 is a device that displays an image, and includes a liquid crystal display device or an organic electroluminescence (EL) display device. Display 14 displays, in display areas 15*h*, 15*g*, an image indicated by text data of the spoken sentence, text data of the translated sentence, and text data of the reverse-translated sentence from controller 22. Display 14 is an example of a display unit that displays text data of the spoken sentence, text data of the translated sentence, and text data of the reverse-translated sentence to the host or the guest. Further, display 14 displays speech icons 14*h*, 14*g* described above.

Touch panel 16 is an example of an operation unit operated by the user, and receives an instruction from the user. Touch panel 16 is disposed so as to overlap display 14. Translation device 1 may include, as an operation unit, not limited to touch panel 16, a keyboard, buttons, switches, and a combination thereof.

1-3. Various Information

Extraction model information 31, proper noun dictionary 32, provisional registration information 33, alternative word dictionary 34, and replacement information 35 stored in storage unit 20 will be described with reference to FIGS. 3 to 7.

FIG. 3 is a diagram for describing an extraction model. The extraction model is a model that extracts a proper noun from a sentence by analyzing a phrase structure and a word structure of the sentence. Translation device 1 stores extraction model information 31 indicating the extraction model in storage unit 20 in advance. The extraction model is generated by, for example, a model generation device. This model generation device may be a device (for example, a server) different from translation device 1, or may be translation device 1. The model generation device generates the extraction model by using text data of a proper noun and text data of a sentence including a proper noun as learning data in advance. For example, in generating the extraction model, the model generation device analyzes a word structure of the proper noun based on information such as a morpheme of the proper noun, and learns features of a part that becomes the proper noun. For example, if common nouns are continuous, it is learned that they may be proper nouns. Thereby, the model generation device generates proper noun morpheme information indicating the features of the part that becomes the proper noun. Further, the model generation device learns the probability distribution of information appearing before and after the noun by analyzing the structure of the entire phrase of the sentence. For example, the probability that words such as "ha" and "ni" are present before and after the noun is learned. As a result, the model generation device generates phrase structure analysis information indicating the features of the phrase including the proper noun. Then, the model generation device determines the specific gravity of the proper noun morpheme information and the phrase structure analysis information, and generates the extraction model. Translation device 1 extracts the proper noun during translation using extraction model information 31. Thus, for example, when the host speaks spoken sentence ST1 ("Kinki Bureau of Economy, Trade and Industry is over there."), the phrase structure and word structure are analyzed by the extraction model, and proper noun candidate N1 ("Kinki Bureau of Economy, Trade and Industry") is extracted.

FIG. 4 shows an example of proper noun dictionary 32. Proper noun dictionary 32 registers parallel translation of a proper noun in a first language (Japanese) and a second language (English). Proper noun dictionary 32 further includes a class name that is information indicating a class of the proper noun. The class classifies terms of the proper noun and is a target category (genre) indicated by the terms. The class includes, for example, a place name and a person name. In this description, "proper noun", "translation word of proper noun", and "class name" are collectively referred to also as "information on proper noun".

FIG. 5 is a diagram for describing provisional registration information 33. Provisional registration information 33 registers parallel translation of a proper noun candidate in the first language (Japanese) and the second language (English). Provisional registration information 33 further includes a class name that is information indicating a class of the proper noun candidate. The class classifies terms of the proper noun candidate and is a target category (genre) indicated by the terms. The class includes, for example, a place name and a person name. In this description, "proper noun candidate", "translation word of proper noun candidate", and "class name" are collectively referred to also as "information on proper noun candidate".

FIG. 6 shows an example of alternative word dictionary 34. Alternative word dictionary 34 includes an alternative word used in place of a proper noun or a proper noun candidate during translation. The alternative word included in alternative word dictionary 34 is a general term that is correctly translated by the translation engine. The alternative word included in alternative word dictionary 34 includes a words and a phrase. For example, alternative word dictionary 34 includes a common noun. The term included in alternative word dictionary 34 is described in parallel translation of a plurality of languages (Japanese and English in the present exemplary embodiment). In this description, among the terms described in parallel translation of a plurality of languages in alternative word dictionary 34, the term described in the language of the speaker is referred to as an "alternative word", and the term described in the language to be translated is referred to as a "translation word of an alternative word." Alternative word dictionary 34 includes, for each class, one or more alternative words and their translation words.

FIG. 7 shows an example of replacement information 35. Replacement information 35 is information that associates a term before replacement with a term after replacement. Replacement information 35 is generated when a translated sentence is generated by the replacement process.

2. Operation 2-1. Translation Process

Figure 8:
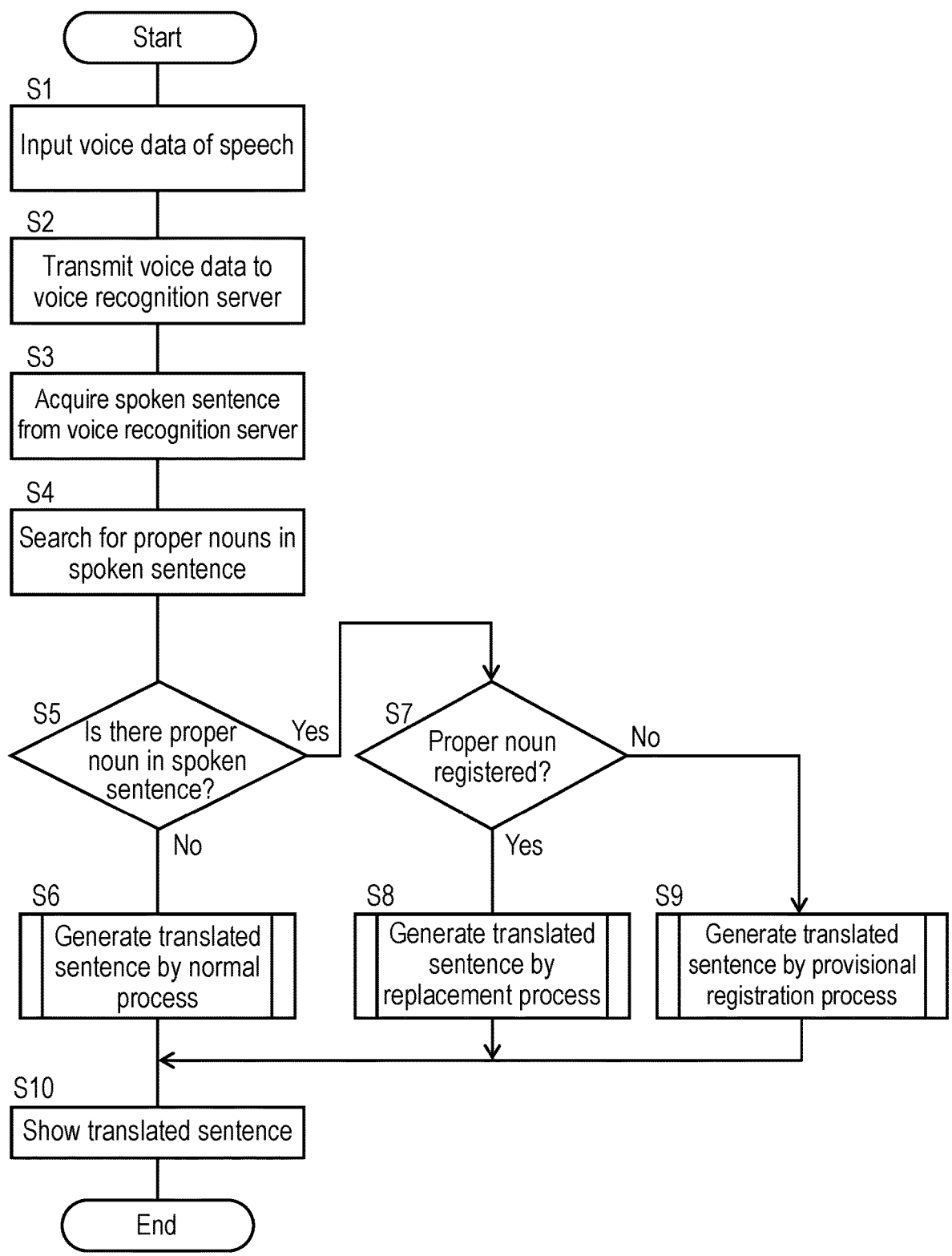
FIG. 8 is a flowchart showing a translation process performed by a controller of the translation device.

The operation of translation system 100 configured as described above will be described with reference to FIG. 8. FIG. 8 shows the operation by controller 22 of translation device 1. FIG. 8 illustrates an example of translating a spoken sentence corresponding to the voice of the speaker input from microphone 10 as an original sentence.

Controller 22 of translation device 1 inputs digital voice data corresponding to the speech (voice) of the speaker via microphone 10 (S1). That is, microphone 10 receives an input of a spoken sentence. Controller 22 transmits the digital voice data to voice recognition server 3 via network 2 (S2). Voice recognition server 3 voice-recognizes the received digital voice data to generate text data of the spoken sentence. Controller 22 of translation device 1 receives the text data of the spoken sentence from voice recognition server 3 via network 2 (S3).

Controller 22 searches for a proper noun in the spoken sentence (S4), and determines whether there is a proper noun in the spoken sentence (S5). Specifically, a proper noun is extracted from the text data of the spoken sentence (original sentence) by use of extraction model information 31. For example, as shown in FIG. 3, when the spoken sentence is sentence ST1, proper noun candidate N1 is extracted as a proper noun by the extraction model.

If there is no proper noun in the spoken sentence (No in S5), controller 22 generates a translated sentence by the normal process (S6). If there is a proper noun in the spoken sentence (Yes in S5), controller 22 determines whether the proper noun is registered in proper noun dictionary 32 (S7). If the proper noun is registered in proper noun dictionary 32 (Yes in S7), controller 22 generates a translated sentence by the replacement process (S8). If the proper noun is not registered in proper noun dictionary 32 (No in S7), controller 22 generates a translated sentence by the provisional registration process (S9).

Controller 22 displays the translated sentence generated in step S6, S8, or S9 on display 14 (S10). Controller 22 may output the translated sentence in voice at the same time as displaying the translated sentence. In this case, controller 22 transmits text data of the translated sentence generated in step S6, S8, or S9 to voice synthesis server 5 via network 2. Voice synthesis server 5 performs voice synthesis based on the text data of the translated sentence received from translation device 1 to generate a voice signal, and transmits the voice signal to translation device 1 via network 2. Controller 22 outputs a voice indicating the translation result from speaker 12 based on the voice signal received from voice synthesis server 5.

2-2. Generation of Translated Sentence by Normal Process

Figure 9:
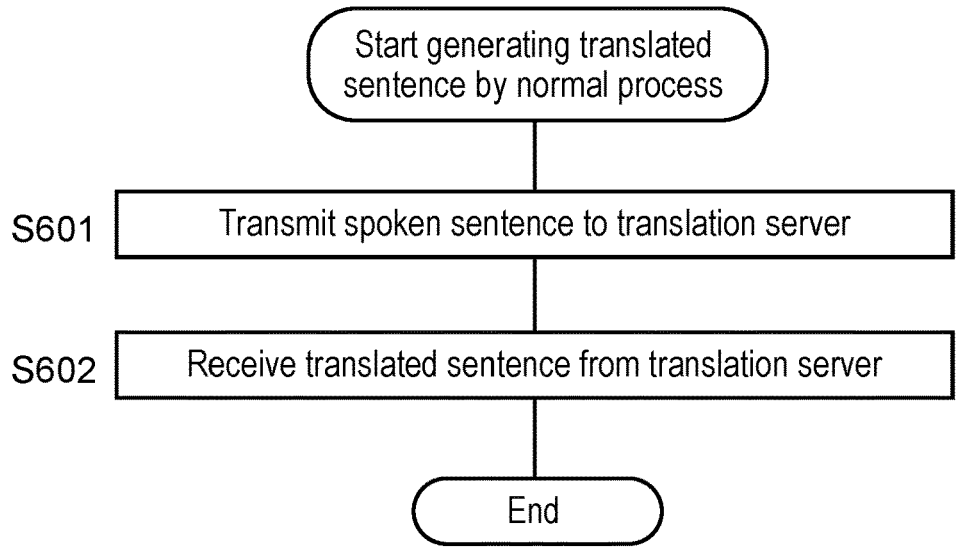
FIG. 9 is a flowchart showing a process of generating a translated sentence by a normal process.

With reference to FIG. 9, generation of a translated sentence by the normal process will be described. FIG. 9 shows a process of generating a translated sentence by the normal process (details of step S6 in FIG. 8). When a proper noun is not included in the spoken sentence, controller 22 of translation device 1 generates a translated sentence by the normal process shown in FIG. 9. First, controller 22 transmits the text data of the spoken sentence to translation server 4 via network 2 (S601). Translation server 4 translates the spoken sentence in the first language into the second language to generate text data of the translated sentence. Translation server 4 transmits the text data of the translated sentence to translation device 1 via network 2. Translation device 1 receives the text data of the translated sentence from translation server 4 via network 2 (S602). For example, in the normal process, translation device 1 transmits a spoken sentence ("Tokyo Station is over there.") to translation server 4 and receives a translated sentence ("Tokyo Station is over there.") from translation server 4.

2-3. Generation of Translated Sentence by Replacement Process

Figure 10:
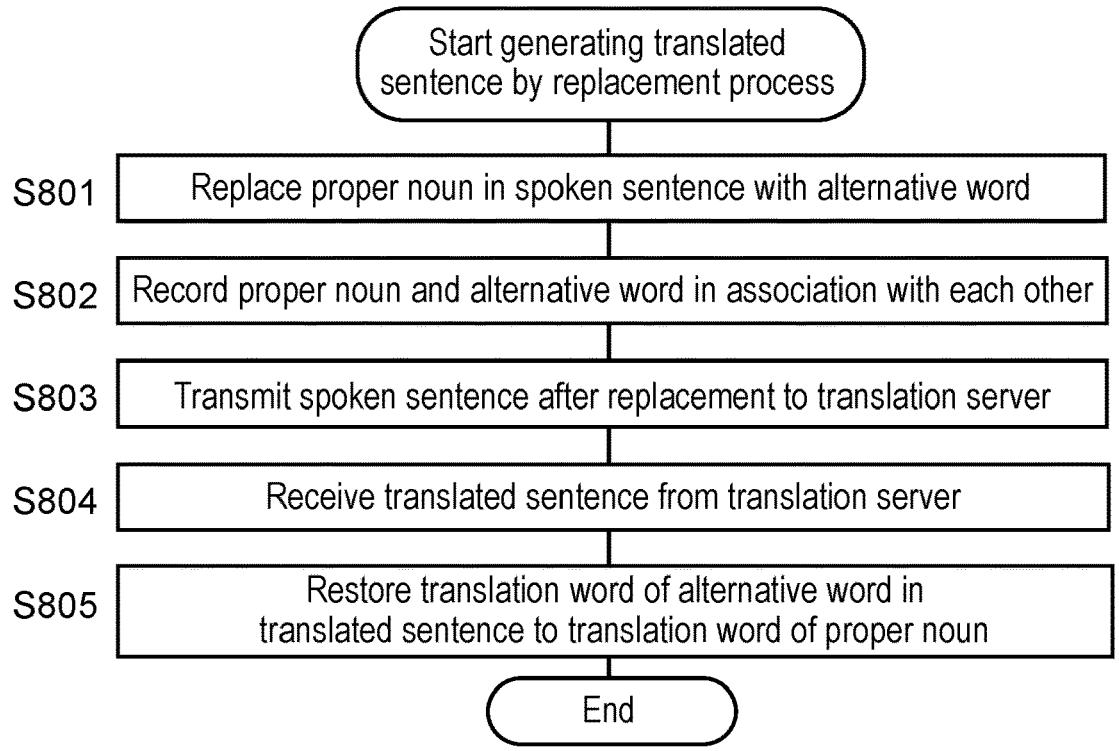
FIG. 10 is a flowchart showing a process of generating a translated sentence by a replacement process.
Figure 11:
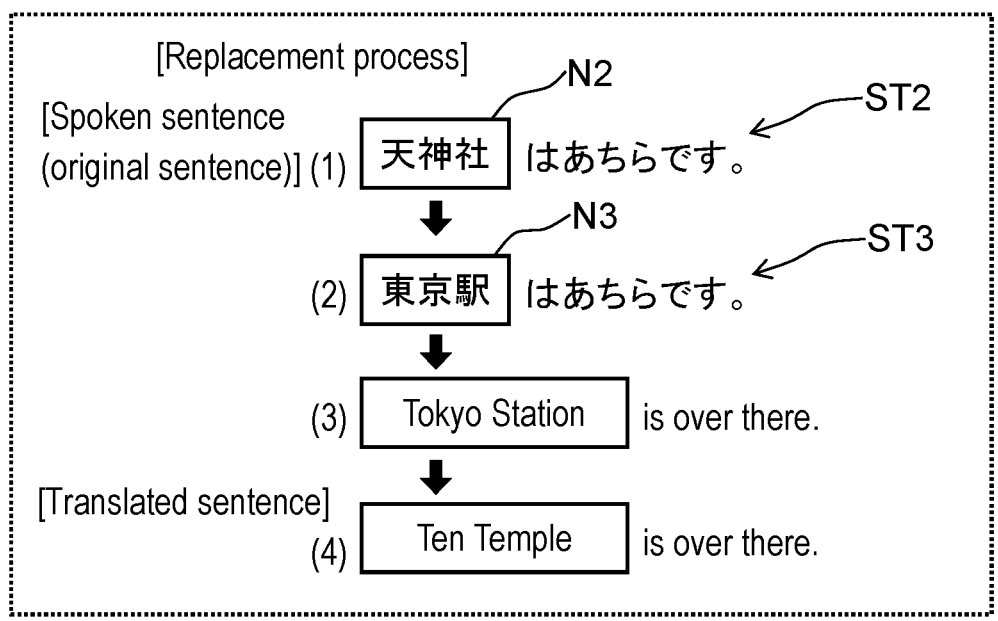
FIG. 11 is a diagram for describing an outline of the replacement process.

With reference to FIGS. 10 and 11, generation of a translated sentence by the replacement process will be described. FIG. 10 shows a process of generating a translated sentence by the replacement process (details of step S8 in FIG. 8). FIG. 11 shows an outline of generating a translated sentence by the replacement process. When the proper noun included in the spoken sentence is registered in proper noun dictionary 32, controller 22 of translation device 1 generates a translated sentence by the replacement process shown in FIG. 10.

First, controller 22 of translation device 1 replaces a proper noun in a spoken sentence with an alternative word (S801). For example, controller 22 replaces proper noun N2 ("Ten Shrine") included in spoken sentence ST2 ("Ten Shrine is over there.") with an alternative word. At this time, controller 22 replaces the proper noun with an alternative word corresponding to the class. As shown in FIG. 4, the class to which the term of proper noun N2 registered in proper noun dictionary 32 belongs is "place name". As shown in FIG. 6, alternative word dictionary 34 registers alternative word N3 ("Tokyo Station") belonging to the class "place name". Therefore, controller 22 selects alternative word N3 from alternative word dictionary 34 based on the class "place name". As shown in (1) to (2) of FIG. 11, controller 22 replaces the character of proper noun N2 in the sentence of spoken sentence ST2 with alternative word N3.

Controller 22 records the proper noun and the alternative word after replacement in association with each other as replacement information 35 (S802). For example, as shown in replacement information 35 of FIG. 7, proper noun N2 is recorded as a term before replacement, and alternative word N3 is recorded as a term after replacement.

Controller 22 transmits the text data of the spoken sentence after the replacement to translation server 4 via network 2 (S803). Here, alternative text ST3 ("Tokyo Station is over there.") including alternative word N3 is transmitted. Translation server 4 translates the received text data of the spoken sentence to generate text data of the translated sentence. As shown in (2) to (3) of FIG. 11, translation server 4 translates alternative text ST3 into "Tokyo Station is over there." Translation server 4 transmits the text data of the translated sentence to translation device 1 via network 2. Controller 22 of translation device 1 receives the text data of the translated sentence from translation server 4 via network 2 (S804).

Controller 22 restores the translation word of the alternative word in the translated sentence to the translation word of the proper noun (S805). As a result, as shown in (3) to (4) of FIG. 11, "Tokyo Station is over there." is restored to "Ten Temple is over there." Specifically, first, controller 22 reads the translation word "Tokyo Station" from alternative word dictionary 34 shown in FIG. 6, based on alternative word N3 after replacement in replacement information 35 shown in FIG. 7. Further, controller 22 reads the translation word "Ten Temple" from proper noun dictionary 32 shown in FIG. 4 based on proper noun N2 before replacement in replacement information 35. Then, controller 22 replaces "Tokyo Station" in the translated sentence with "Ten Temple".

2-4. Generation of Translated Sentence by Provisional Registration Process

With reference to FIGS. 12 to 15, the generation of a translated sentence by the provisional registration process will be specifically described.

Figure 12:
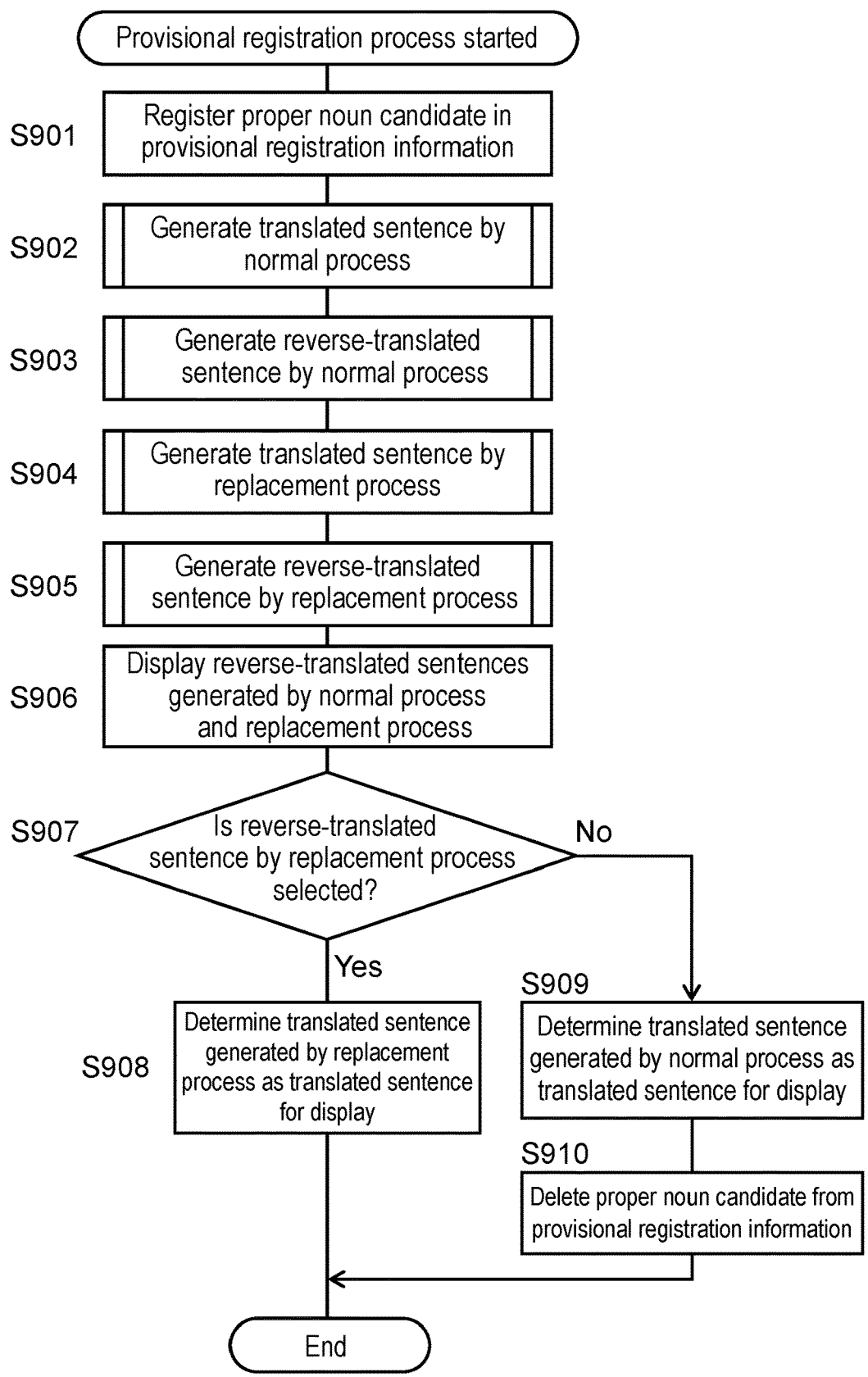
FIG. 12 is a flowchart showing a process of generating a translated sentence by a provisional registration process.

FIG. 12 shows a process of generating a translated sentence by the provisional registration process (details of step S9 in FIG. 8). When the proper noun included in the spoken sentence is not registered in proper noun dictionary 32, controller 22 of translation device 1 generates a translated sentence by the provisional registration process shown in FIG. 12.

First, controller 22 of translation device 1 generates a translation word of the proper noun candidate (unregistered proper noun) found by the search in step S4 of FIG. 8, and registers information on the proper noun candidate in provisional registration information 33 (S901). That is, controller 22 registers the proper noun candidate, the translation word of the proper noun candidate, and the class name in provisional registration information 33.

With reference to FIG. 13, generation of a translation word of a proper noun candidate will be described. Specifically, first, controller 22 morphologically analyzes the proper noun candidate and divides the proper noun candidate into a plurality of nouns. Thus, proper noun candidate N1 is divided into, for example, noun N11 ("Kinki"), noun N12 ("economy"), noun N13 ("industry"), and noun N14 ("bureau"). Then, controller 22 generates a translation word of each noun. For example, the translation words "Kinki", "Economy", "Industry", and "Bureau" of nouns N11 to N14 are generated. The translation word of each noun constituting the proper noun candidate may be generated by the same method or different methods. In one example, storage unit 20 of translation device 1 stores a dictionary of terms including parallel translations of the first language and the second language in advance, and controller 22 of translation device 1 generates a translation word of a proper noun candidate based on the dictionary. In another example, when the proper noun candidate includes a general noun and a place name, the text data of the general noun and the place name is transmitted to translation server 4, and the translation result of the general noun and the place name is acquired from translation server 4. Further, when the proper noun candidate includes a unique part different from the general noun and the place name, controller 22 of translation device 1 converts the unique part into the alphabets of the reading sound. Controller 22 combines the translation results of each noun to generate a translation word of the proper noun candidate. In the case of FIG. 13, "Kinki Economy Industry Bureau" is generated as a translation word of proper noun candidate N1. Then, controller 22 registers the proper noun candidate and the translation word thereof in provisional registration information 33. At this time, controller 22 identifies the class from the terms constituting the proper noun candidate, and also registers the class name in provisional registration information 33.

Controller 22 translates the spoken sentence (original sentence) in the first language into the second language to generate a translated sentence by the normal process (S902). Generation of a translated sentence by the normal process is performed by steps S601 and S602 shown in FIG. 9 as described above. Controller 22 re-translates the generated translated sentence into the first language to generate a reverse-translated sentence by the normal process (S903). Details of the generation of the reverse-translated sentence by the normal process will be described later.

Controller 22, using provisional registration information 33, translates the spoken sentence (original sentence) in the first language into the second language to generate a translated sentence by the replacement process (S904). Generation of a translated sentence by the replacement process is performed by steps S801 to S805 shown in FIG. 10 as described above. In this case, the proper noun candidate included in the spoken sentence is replaced with an alternative word corresponding to the class. Controller 22 re-translates the generated translated sentence into the first language to generate a reverse-translated sentence by the replacement process (S905). Details of the generation of the reverse-translated sentence by the replacement process will be described later.

As shown in steps S902 to S905, in the provisional registration process, in both the normal process and the replacement process, the original sentence is translated to generate a translated sentence, and the translated sentence is further returned to the first language to generate a reverse-translated sentence.

With reference to FIG. 14, specific examples of a translated sentence and a reverse-translated sentence generated by the normal process and the replacement process shown in steps S902 to S905 will be described. FIG. 14 shows a comparison between a translated sentence and a reverse-translated sentence by the normal process and the replacement process. In normal process P1, an original sentence (spoken sentence) is directly translated to generate a translated sentence. For example, when a speaker (host) speaks spoken sentence ST1, the text (spoken sentence) called spoken sentence ST1 is translated into the text (translated sentence) of "Close the industry office is over there." by the translation engine of translation server 4. When a reverse-translated sentence is generated, the translated sentence is directly translated into the original language by the translation engine. As a result, the text of reverse-translated sentence ST4 ("the office near the industry is over there.") is obtained.

In replacement process P2, for example, when the speaker (host) speaks spoken sentence ST1, the proper noun candidate in the original sentence (spoken sentence) is replaced with an alternative word and then translation is performed. Here, alternative word N3 is selected from alternative word dictionary 34 based on the class "place name" of proper noun candidate N1, and proper noun candidate N1 in the spoken sentence is replaced with alternative word N3. In this case, proper noun candidate N1 and alternative word N3 are recorded as replacement information 35 in association with each other. Then, the text of alternative text ST3 is translated into a text of "Tokyo Station is over there." as an alternative translated sentence by the translation engine of translation server 4. Based on provisional registration information 33, alternative word dictionary 34, and replacement information 35, translation device 1 replaces "Tokyo Station", which is a translation word of alternative word N3, with "Kinki Economy Industry Bureau", which is a translation word of proper noun candidate N1. As a result, "Kinki Economy Industry Bureau is over there." is obtained as a translated sentence. When a reverse-translated sentence is generated, "Kinki Economy Industry Bureau" in the translated sentence is replaced with "Tokyo Station" again, and the text "Tokyo Station is over there." in the alternative translated sentence is returned to the original language by the translation engine. As a result, alternative reverse-translated sentence ST5, which is a text ("Tokyo station is over there."), is obtained. Based on replacement information 35, translation device 1 restores alternative word N3 in the obtained text to proper noun candidate N1, thereby generating reverse-translated sentence ST6 ("Kinki Bureau of Economy, Trade and Industry is over there."). When the reverse-translated sentence is generated, as described above, "Kinki Economy Industry Bureau" in the translated sentence may be replaced with "Tokyo Station" again to generate an alternative translated sentence ((5) of replacement process P2), or the alternative translated sentence ((3) of replacement process P2) translated by the translation engine may be used as it is.

As shown in FIG. 14, even in the case of the same spoken sentence, a generated translated sentence and a reverse-translated sentence may differ between normal process P1 and replacement process P2.

Figure 15:
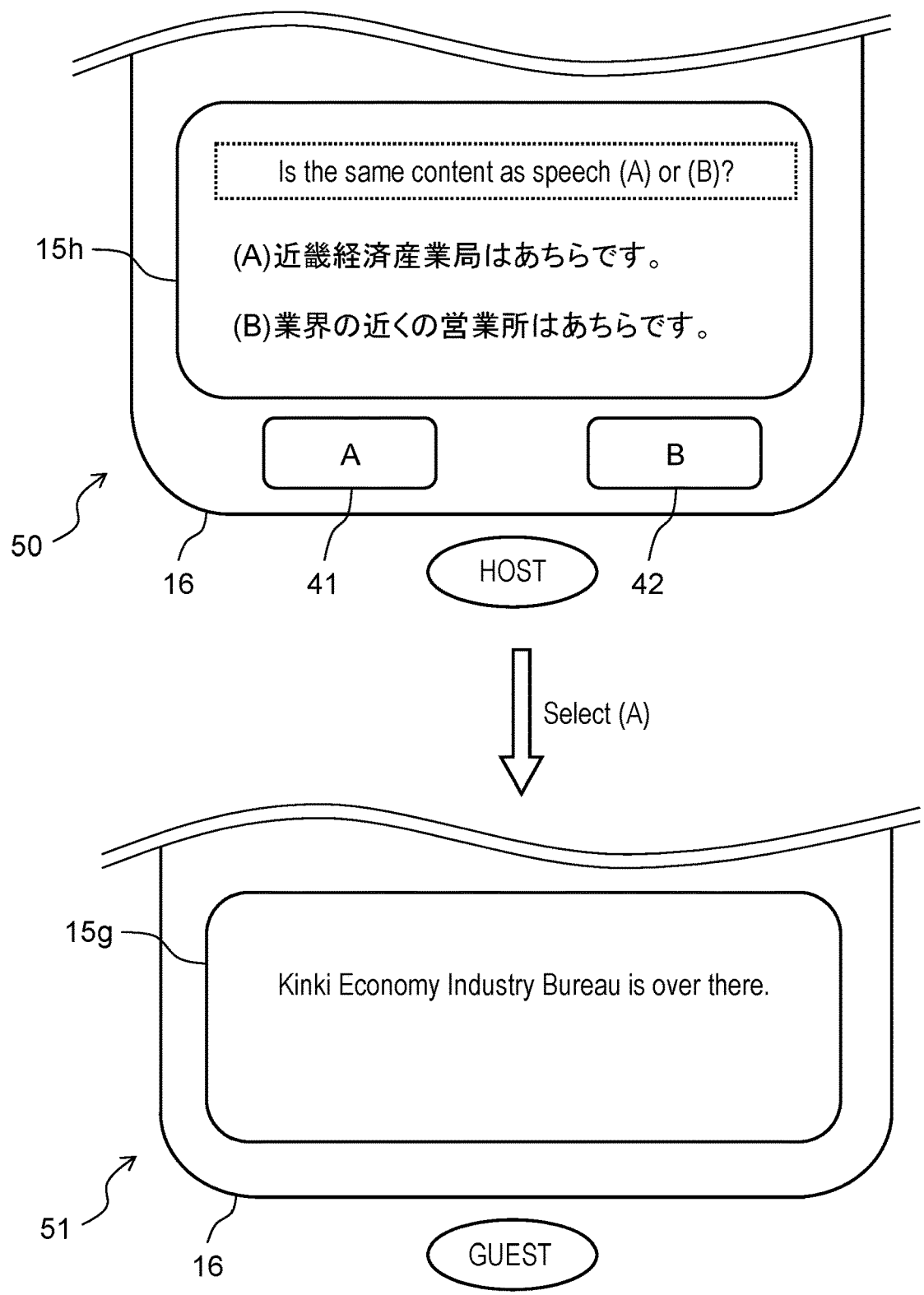
FIG. 15 is a diagram showing an example of a display screen of a reverse-translated sentence and a display screen of a translated sentence according to a selection result.

Controller 22 displays the reverse-translated sentences generated by the normal process and the replacement process in display area 15h on the host side (S906). FIG. 15 shows an example of display screen 50 of the reverse-translated sentences, and an example of display screen 51 of the translated sentence when reverse-translated sentence (A) is selected. As shown in display screen 50 of FIG. 15, controller 22 displays reverse-translated sentence (A) generated by the replacement process and reverse-translated sentence (B) generated by the normal process in display area 15h on the speaker (host) side. Further, controller 22 displays, in display area 15h, a text inquiring which of reverse-translated sentences (A) and (B) is correct. In addition, selection icon 41 and selection icon 42 for selecting reverse-translated sentences (A) and (B) are displayed on touch panel 16. Thus, by selecting selection icon 41 or selection icon 42, the host can select a reverse-translated sentence that is the same as or similar to the speech from reverse-translated sentences (A) and (B).

Controller 22 determines whether the reverse-translated sentence by the replacement process has been selected by the speaker (host) (S907). When the reverse-translated sentence by the replacement process is selected (Yes in S907), controller 22 determines the translated sentence generated by the replacement process as the translated sentence for display (S908). When the reverse-translated sentence by the normal process is selected (No in S907), controller 22 determines the translated sentence generated by the normal process as the translated sentence for display (S909). When the reverse-translated sentence by the normal process is selected, controller 22 deletes the proper noun candidate, translation word, and class name registered in provisional registration information 33 in step S901 from provisional registration information 33 (S910).

In step S908 or S909, the translated sentence determined as the translated sentence for display is displayed in display area 15g on the guest side (S10 in FIG. 8). For example, as shown in FIG. 15, when the host touches selection icon 41 to select reverse-translated sentence (A) generated by the replacement process, the "Kinki Economy Industry Bureau is over there." in the translated sentence generated by the replacement process is displayed in display area 15g on the guest side.

2-5. Generation of Reverse-Translated Sentence by Normal Process

Figure 16:
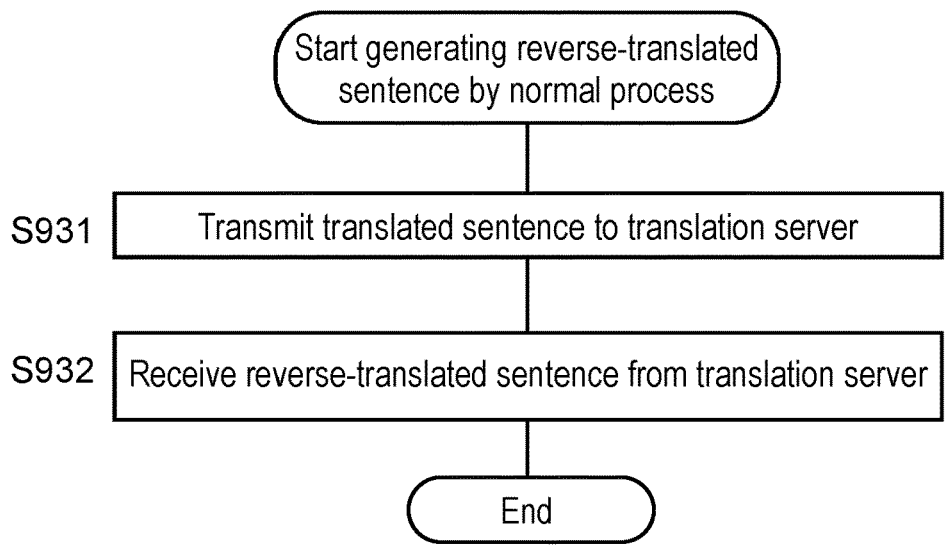
FIG. 16 is a flowchart showing a process of generating a reverse-translated sentence by the normal process.

With reference to FIG. 16, the generation of a reverse-translated sentence by the normal process will be described. FIG. 16 shows a process of generating a reverse-translated sentence by the normal process (details of step S903 in FIG. 12). Controller 22 of translation device 1 transmits the text data of the translated sentence to translation server 4 via network 2 (S931). Translation server 4 translates the translated sentence in the second language into the first language to generate text data of the reverse-translated sentence. Translation server 4 transmits the text data of the reverse-translated sentence to translation device 1 via network 2. Controller 22 of translation device 1 receives the text data of the reverse-translated sentence from translation server 4 via network 2 (S932).

2-6. Generation of Reverse-Translated Sentence by Replacement Process

Figure 17:
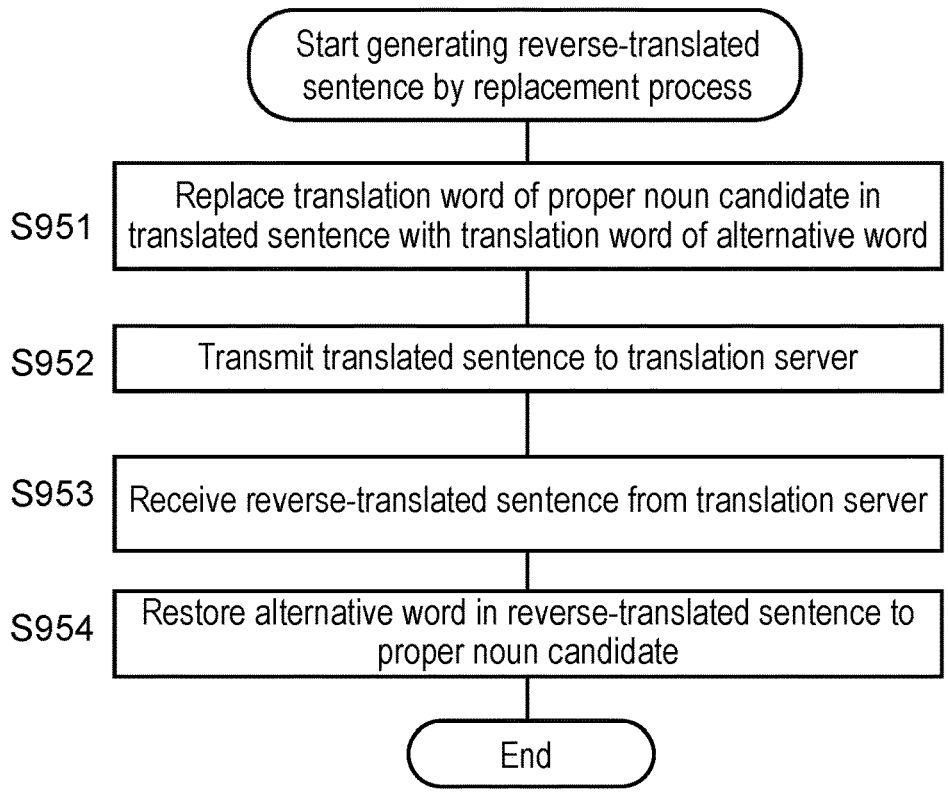
FIG. 17 is a flowchart showing a process of generating a reverse-translated sentence by the replacement process.

With reference to FIG. 17, the generation of a reverse-translated sentence by the replacement process will be described. FIG. 17 shows a process of generating a reverse-translated sentence by the replacement process (details of step S905 in FIG. 12). Controller 22 replaces the translation word of the proper noun candidate in the translated sentence with the translation word of the alternative word based on replacement information 35 (S951). Specifically, controller 22 reads the translation word "Tokyo Station" from alternative word dictionary 34 based on alternative word N3 after the replacement in replacement information 35. Then, controller 22 converts "Kinki Economy Industry Bureau" in the translated sentence "Kinki Economy Industry Bureau is over there." into "Tokyo Station". Controller 22 of translation device 1 transmits the text data of the translated sentence after the replacement to translation server 4 via network 2 (S952). In addition, "Tokyo Station is over there." of the translated sentence (alternative translated sentence) received in step S804 of FIG. 10 may be transmitted to translation server 4. In this case, step S951 is omitted. Translation server 4 translates the translated sentence in the second language into the first language to generate text data of the reverse-translated sentence. Translation server 4 transmits the text data of the reverse-translated sentence to translation device 1 via network 2. Controller 22 of translation device 1 receives the text data of the reverse-translated sentence from translation server 4 via network 2 (S953). Here, alternative reverse-translated sentence ST5 is received. Controller 22 restores the alternative word in the reverse-translated sentence to a proper noun candidate based on replacement information 35 (S954). Here, alternative word N3 is restored to proper noun candidate N1.

2-7. Formal Registration Process of Proper Noun Candidate

Figure 18:
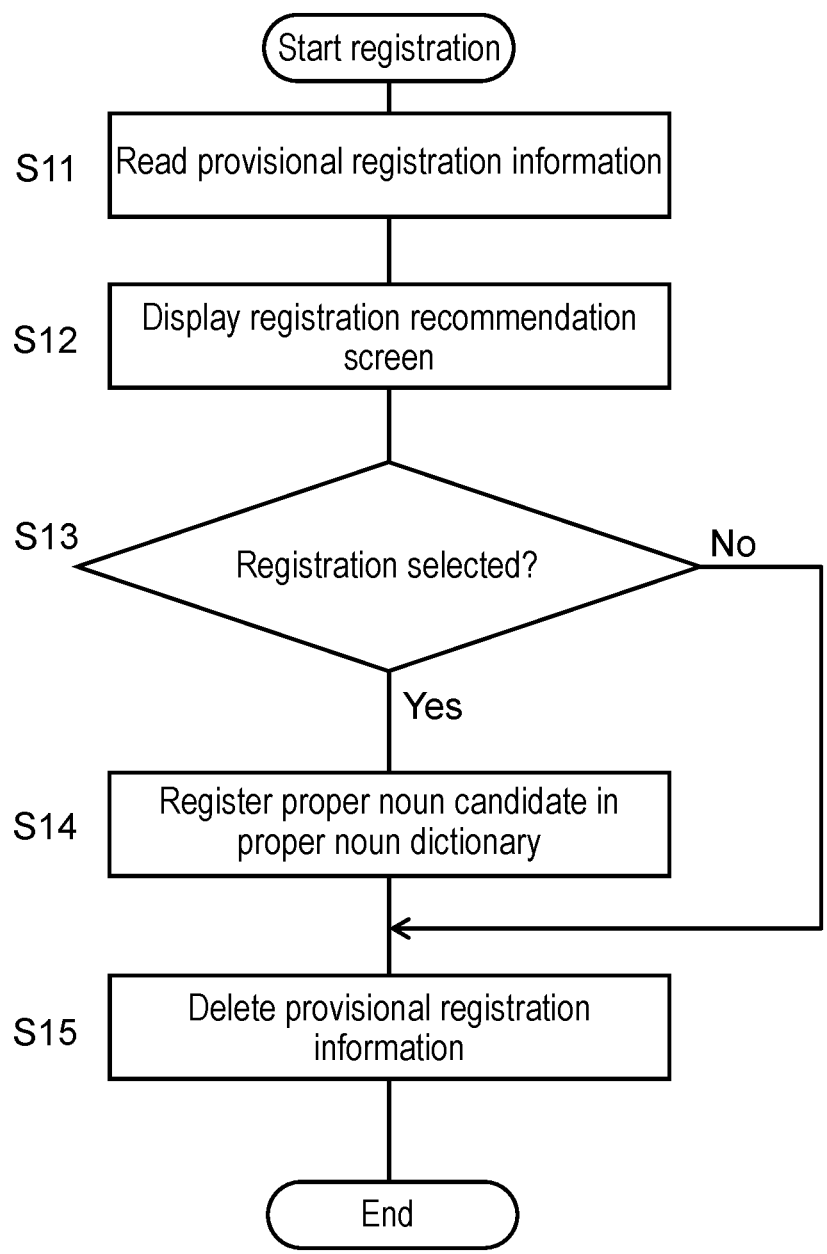
FIG. 18 is a flowchart showing a registration recommendation process by the controller of the translation device.
Figure 19:
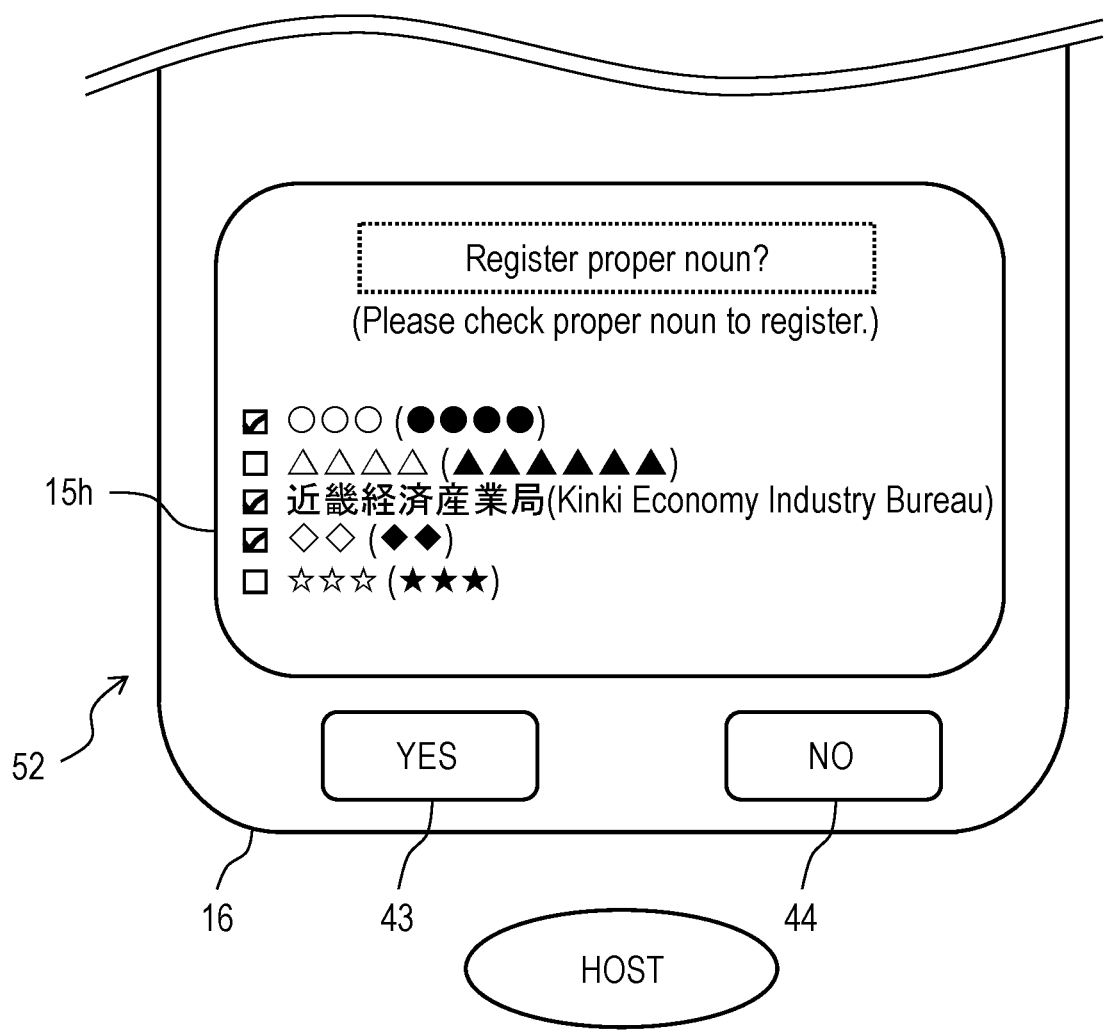
FIG. 19 is a diagram showing an example of a registration recommendation screen.

With reference to FIGS. 18 and 19, the formal registration of a proper noun candidate will be described. FIG. 18 shows a registration recommendation process by controller 22 of translation device 1. FIG. 19 shows an example of a registration recommendation screen. The registration recommendation process is performed after the user selects a reverse-translated sentence (after step S907 in FIG. 12). Specifically, the registration recommendation process is performed, for example, after the translated sentence is displayed (after step S10 in FIG. 8) and when the host and the guest do not talk with each other.

Controller 22 reads provisional registration information 33 from storage unit 20 (S11). Controller 22 displays a registration recommendation screen of a proper noun candidate on display 14 based on read provisional registration information 33 (S12). The registration recommendation screen is a screen for inquiring whether registration of a proper noun candidate is necessary. For example, as shown in FIG. 19, registration recommendation screen 52 includes a list of proper noun candidates and their translation words registered in provisional registration information 33, a check box for selecting each proper noun candidate, and "yes" icon 43 and "no" icon 44 for determining whether registration of a proper noun candidate is necessary. The list of proper noun candidates and their translation words is displayed in display area 15h on the host side. Icons 43, 44 for determining whether registration of a proper noun candidate is necessary are displayed on touch panel 16 on the host side.

Controller 22 determines whether registration has been selected (S13). For example, in FIG. 19, controller 22 determines whether "Yes" icon 43 for instructing registration has been selected in a state where one or more proper noun candidates have been selected. When registration is selected (Yes in S13), controller 22 registers information on the proper noun candidate whose registration is selected in proper noun dictionary 32 (S14). Specifically, for example, based on provisional registration information 33, the selected proper noun candidate, and the translation word and the class name of the proper noun candidate are registered in proper noun dictionary 32. Then, provisional registration information 33 is deleted from storage unit 20 (S15). When no proper noun candidate to be registered is selected (No in S13), provisional registration information 33 is deleted without execution of step S14 (S15). For example, in FIG. 19, when "No" icon 44 is selected, provisional registration information 33 is deleted without registration of the information on the proper noun candidate in proper noun dictionary 32.

From the above, the host just checks the displayed list of the proper noun candidates and their translation words, selects the proper noun candidate to be registered, and selects icon 43 for determining the registration, and thereby the proper noun candidate can be registered in proper noun dictionary 32.

3. Effects and Others

Translation device 1 of the present exemplary embodiment performs translation using proper noun dictionary 32 (an example of registration information) indicating a proper noun (an example of a term to be replaced). Translation device 1 includes microphone 10 (an example of an input unit) for inputting an original sentence in a first language, storage unit 20 for storing proper noun dictionary 32, and controller 22. Controller 22 generates a first translated sentence by translating an original sentence into a second language and a first reverse-translated sentence by translating the first translated sentence into a first language and extracts a proper noun candidate from the original sentence, generates a translation word of the proper noun candidate in the second language, generates provisional registration information 33 that associates the proper noun candidate with the translation word of the proper noun candidate, and generates a second translated sentence by translating the original sentence into the second language based on provisional registration information 33 and a second reverse-translated sentence by translating the second translated sentence into the first language. Further, translation device 1 includes display 14 (an example of a display unit) that displays the first reverse-translated sentence and the second reverse-translated sentence, and touch panel 16 (an example of an operation unit) that receives a user operation as to whether to select the second reverse-translated sentence. When the user selects the second reverse-translated sentence, controller 22 uses the proper noun candidate as a new proper noun, and based on provisional registration information 33, registers the proper noun candidate and the translation word of the proper noun candidate in proper noun dictionary 32.

Specifically, when the user selects the second reverse-translated sentence, controller 22 causes display 14 to display a screen (e.g., registration recommendation screen 52) for inquiring whether to register the proper noun candidate. Then, when receiving a registration instruction from the user via touch panel 16, controller 22 registers the proper noun candidate and the translation word of the proper noun candidate in proper noun dictionary 32.

Thus, the user, after confirming the reverse-translated sentence of the original sentence including the proper noun candidate, can register the proper noun candidate in proper noun dictionary 32 simply by selecting whether to register the proper noun candidate. This eliminates the need for the user to manually input an unregistered proper noun. Therefore, according to translation device 1 of the present disclosure, convenience when registering an unregistered proper noun is improved.

Controller 22, when the user selects the first reverse-translated sentence, displays the first translated sentence on display 14 as a translated sentence of the original sentence, and when the user selects the second reverse-translated sentence, displays the second translated sentence on display 14 as a translated sentence of the original sentence.

This makes it possible to select a translated sentence to be displayed as a translation result from the first translated sentence and the second translated sentence according to a user's selection of the first reverse-translated sentence or the second reverse-translated sentence. Therefore, even if the proper noun is included in the original sentence, a highly accurate translated sentence can be displayed.

Further, translation device 1 of the present exemplary embodiment includes microphone 10, controller 22, display 14, and touch panel 16. Microphone 10 receives the input of the original sentence in the first language. Controller 22 obtains a first translated sentence generated by translating the original sentence into the second language and a first reverse-translated sentence generated by translating the first translated sentence into the first language. Controller 22 extracts a proper noun candidate from an original sentence, generates a translation word of the proper noun candidate in the second language, generates a second translated sentence by translating the original sentence into the second language based on the proper noun candidate and the translation word of the proper noun candidate, and generates a second reverse-translated sentence by translating the second translated sentence into the first language based on the proper noun candidate and the translation word of the proper noun candidate. Display 14 displays the first reverse-translated sentence and the second reverse-translated sentence. Touch panel 16 receives a user operation of selecting one of the first reverse-translated sentence and the second reverse-translated sentence. Controller 22 displays one of the first translated sentence and the second translated sentence on display 14 as a translated sentence of the original sentence according to the user's selection.

Thereby, a translated sentence to be displayed as a translation result is selected from the first translated sentence and the second translated sentence according to the user's selection of the first reverse-translated sentence or the second reverse-translated sentence. Therefore, a translated sentence closer to the original sentence can be displayed. Therefore, even if the proper noun is included in the original sentence, a highly accurate translated sentence can be displayed.

Other Exemplary Embodiments

As described above, the exemplary embodiment has been described as the example of the technique disclosed in the present application. However, the technique according to the present disclosure is not limited to the above exemplary embodiment, but is applicable to other exemplary embodiments including appropriate modifications, replacements, additions, omissions, and the like. Accordingly, other exemplary embodiments will be described below.

In the above exemplary embodiment, registration recommendation screen 52 as shown in FIG. 19 is displayed, and when the speaker selects the registration of the proper noun candidate, the proper noun candidate and its translation word are registered in proper noun dictionary 32. However, the timing of registering the proper noun candidate and its translation word in proper noun dictionary 32 is not limited to the above exemplary embodiment. The proper noun candidate and its translation word may be registered in proper noun dictionary 32 without displaying of registration recommendation screen 52. For example, when screen 50 for selecting any of the reverse-translated sentences of the replacement process and the normal process as shown in FIG. 15 is displayed, and the reverse-translated sentence by the replacement process is selected (YES in step S907 of FIG. 12), the proper noun candidate and its translation word may be registered in proper noun dictionary 32. As a result, the proper noun candidate is registered as a new proper noun, even if the user is not aware of the registration of the proper noun. Therefore, convenience in registering the proper noun is improved.

In the above exemplary embodiment, an example has been described in which registration recommendation screen 52 is displayed after the translated sentence is displayed (after step S10 in FIG. 8). However, after provisional registration information 33 is generated, registration recommendation screen 52 may be displayed at an arbitrary timing. For example, registration recommendation screen 52 may be displayed based on provisional registration information 33 before screen 50 for selecting any of the reverse-translated sentences by the replacement process and the normal process is displayed or before the translated sentence is displayed.

In the above exemplary embodiment, as shown in FIG. 15, when the reverse-translated sentence is displayed, one of reverse-translated sentence (A) generated by the replacement process and reverse-translated sentence (B) generated by the normal process is selected by the user. However, the user may be able to deselect both the reverse-translated sentences (A) and (B). For example, a re-input icon for re-inputting the original sentence may be displayed in addition to selection icons 41 and 42 of the reverse-translated sentences (A) and (B). Thus, when both the reverse-translated sentence generated by the normal process and the reverse-translated sentence generated by the replacement process are different from the original sentence, the user can speak again. When the user selects such a re-input icon, the proper noun candidate registered in step S901 in FIG. 12 is deleted from provisional registration information 33. That is, after No in step S907 of FIG. 12, step S909 is not executed, but step S910 is executed.

In the above exemplary embodiment, an example has been described in which a term included in proper noun dictionary 32 is translated by the replacement process when the term is included in the spoken sentence. However, a term to be replaced is not limited to a proper noun. A term (word or phrase) other than a proper noun may be replaced. In this case, a registered dictionary (an example of registered information) including the term to be replaced, its translation word, and a class name may be stored in storage unit 20. The registered dictionary and proper noun dictionary 32 may be unified into one dictionary, or the registered dictionary and proper noun dictionary 32 may be used together.

In the above exemplary embodiment, in generating the translated sentence by the provisional registration process, the translated sentence and the reverse-translated sentence are generated by both the normal process and the replacement process. However, in generating the translated sentence by the provisional registration process, the translated sentence and the reverse-translated sentence may be generated only by the replacement process.

In the above exemplary embodiment, translation device 1 translates the spoken sentence corresponding to a speech (voice) input by microphone 10, but may translate an input text input by other than the speech using a keyboard, a mouse, or the like.

In the above exemplary embodiment, the voice recognition is performed by voice recognition server 3, the translation is performed by translation server 4, and the voice synthesis is performed by voice synthesis server 5. However, the present disclosure is not limited to this. At least one of the voice recognition, translation, and voice synthesis may be performed in translation device 1. For example, translation device 1 (terminal) may be equipped with all the same functions as voice recognition server 3, translation server 4, and voice synthesis server 5, so that only translation device 1 may perform all processes related to translation. In this case, translation device 1 may not have communication unit 18. That is, controller 22 of translation device 1 may acquire a sentence which translation device 1 has generated by performing translation or reverse translation.

In the above exemplary embodiment, an example of translation between Japanese and English has been described. However, the languages to be translated are not limited to Japanese and English, but may be other languages (Chinese, German, French, Spanish, Korean, Thai, Vietnamese, Indonesian, etc.).

Overview of Exemplary Embodiment (1) A translation device of the present disclosure is a translation device that translates using registration information indicating a term to be replaced, and includes an input unit for inputting an original sentence in a first language, a storage unit for storing registration information, and a controller. The controller generates a first translated sentence by translating the original sentence into the second language and a first reverse-translated sentence by translating the first translated sentence into the first language, extracts a proper noun candidate from the original sentence, generates a translation word of the proper noun candidate in the second language, generates provisional registration information that associates the proper noun candidate with the translation word of the proper noun candidate, and generates a second translated sentence by translating the original sentence into the second language based on provisional registration information and a second reverse-translated sentence by translating the second translated sentence into the first language. Furthermore, the translation device includes a display unit that displays the first and second reverse-translated sentences, and an operation unit that receives a user operation as to whether to select the second reverse-translated sentence. The controller, when the user selects the second reverse-translated sentence, uses the proper noun candidate as a new term to be replaced, and registers the proper noun candidate and the translation word of the proper noun candidate in the registration information, based on the provisional registration information.

This eliminates the need for the user to manually input the proper noun when registering the proper noun. The user only needs to confirm the reverse-translated sentence of the original sentence including the proper noun candidate and select (approve) or deselect (reject) the second reverse-translated sentence. This determines whether to register a proper noun. Therefore, according to the translation device of the present disclosure, convenience in registering an unregistered proper noun is improved.

(2) In the translation device of (1), when the user selects the second reverse-translated sentence, the controller causes the display unit to display a screen for inquiring whether to register a proper noun candidate, and when a registration instruction is received from the user via the operation unit, may register a proper noun candidate and a translation word of the proper noun candidate in the registration information.

Thereby, the user can register the proper noun candidate only by selecting whether to register the proper noun candidate. This eliminates the need for the user to manually input proper nouns, and improves convenience when registering unregistered proper nouns.

(3) In the translation device of (1), when the user selects the first reverse-translated sentence, the controller may display the first translated sentence on the display unit as a translated sentence of the original sentence, and when the user selects the second reverse-translated sentence, may display the second translated sentence on the display unit as a translated sentence of the original sentence.

Thereby, a translated sentence to be displayed as a translation result is selected from the first translated sentence and the second translated sentence according to the user's selection of the first reverse-translated sentence or the second reverse-translated sentence. Therefore, a translated sentence closer to the original sentence can be displayed. Therefore, even if the proper noun is included in the original sentence, a highly accurate translated sentence can be displayed.

(4) In the translation device of (1), the storage unit may further store an alternative word dictionary that associates an alternative word in the first language with a translation word of the alternative word in the second language which can be translated by an external device having a translation function from the first language to the second language and a translation function from the second language to the first language. The controller may acquire the first translated sentence by transmitting the original sentence to the external device, and acquire the first reverse-translated sentence by transmitting the first translated sentence to the external device. The controller may transmit the alternative text obtained by replacing the proper noun candidate in the original sentence with the alternative word to the external device, thereby acquiring an alternative translated sentence obtained by translating the alternative text into the second language, and may restore the translation word of the alternative word in the alternative translated sentence to the translation word of the proper noun candidate to generate a second translated sentence. The controller may transmit the alternative translated sentence to the external device, thereby acquiring an alternative reverse-translated sentence obtained by translating the alternative translated sentence into the first language, and may restore the alternative word in the alternative reverse-translated sentence to the proper noun candidate to generate a second reverse-translated sentence.

(5) In the translation device of (1), the controller may extract a proper noun candidate from the original sentence by analyzing the phrase structure and the word structure of the original sentence.

As a result, the proper noun candidate can be accurately extracted from the original sentence.

(6) In the translation device of (1), the controller may divide the proper noun candidate into a plurality of nouns by morphological analysis, and may generate a translation word of the proper noun candidate based on a translation word of each of the plurality of nouns in the second language.

(7) Another translation device includes an input unit that inputs an original sentence in a first language, and a controller. The controller generates a first translated sentence by translating an original sentence into a second language and a first reverse-translated sentence by translating the first translated sentence into the first language and extracts a proper noun candidate from the original sentence, generates a translation word of the proper noun candidate in the second language, generates provisional registration information that associates the proper noun candidate with the translation word of the proper noun candidate, and generates a second translated sentence by translating the original sentence into the second language based on the provisional registration information and a second reverse-translated sentence by translating the second translated sentence into the first language. Further, the translation device includes a display unit that displays the first reverse-translated sentence and the second reverse-translated sentence, and an operation unit that receives a user operation of selecting one of the first reverse-translated sentence and the second reverse-translated sentence. The controller displays one of the first translated sentence and the second translated sentence on the display unit as a translated sentence of the original sentence according to the selection of the user.

Thereby, a translated sentence to be displayed as a translation result is selected from the first translated sentence and the second translated sentence according to the user's selection of the first reverse-translated sentence or the second reverse-translated sentence. Therefore, a translated sentence closer to the original sentence can be displayed. Therefore, even if the proper noun is included in the original sentence, a highly accurate translated sentence can be displayed.

(8) A translation method according to the present disclosure is a translation method for translating using registration information indicating a term to be replaced, the translation method including: inputting, by an input unit, an original sentence in a first language; generating, by an arithmetic unit (controller 22 of translation device 1 and translation server 4), a first translated sentence by translating the original sentence into a second language and a first reverse-translated sentence by translating the first translated sentence into a first language; extracting, by the arithmetic unit (controller 22), a proper noun candidate from the original sentence; generating, by the arithmetic unit (controller 22), a translation word of the proper noun candidate in the second language to generate provisional registration information that associates the proper noun candidate with the translation word of the proper noun candidate; generating, by the arithmetic unit (controller 22 of translation device 1 and translation server 4), a second translated sentence by translating the original sentence into the second language and a second reverse-translated sentence by translating the second translated sentence into the first language based on the provisional registration information; displaying, by a display unit, the first reverse-translated sentence and the second reverse-translated sentence; receiving, by an operation unit, a user operation as to whether to select the second reverse-translated sentence; and when the user selects the second reverse-translated sentence, registering, by the arithmetic unit (controller 22), the proper noun candidate and the translation word of the proper noun candidate in the registration information based on the provisional registration information, using the proper noun candidate as a new term to be replaced.

This eliminates the need for the user to manually input the proper noun when registering the proper noun. The user only needs to confirm the reverse-translated sentence of the original sentence including the proper noun candidate and select (approve) or deselect (reject) the second reverse-translated sentence. This determines whether to register a proper noun. Therefore, according to the translation device of the present disclosure, convenience in registering an unregistered proper noun is improved.

The translation device and the translation method described in all claims of the present disclosure are achieved by hardware resources, for example, cooperation with a processor, a memory, and a program.

INDUSTRIAL APPLICABILITY

The present disclosure is applicable to a translation device that translates based on a speaker's voice or an input text.

REFERENCE MARKS IN THE DRAWINGS

1: translation device
2: network
3: voice recognition server
4: translation server
5: voice synthesis server
10: microphone (input unit)
12: speaker (output unit)
14: display (display)
14h, 14g: speech icon
15h, 15g: display area
16: touch panel (operation unit)
18: communication unit
20: storage unit
22: controller
31: extraction model information
32: proper noun dictionary
33: provisional registration information
34: alternative word dictionary
35: replacement information
100: translation system

The invention claimed is:

1. A translation device comprising:
  an input unit that receives an input of an original sentence in a first language;
  a controller that:
    acquires a first translated sentence generated by translating the original sentence into a second language and a first reverse-translated sentence generated by translating the first translated sentence into the first language,
    extracts a proper noun candidate from the original sentence,
    generates a translation word of the proper noun candidate in the second language,
    translates the original sentence into the second language based on the proper noun candidate and the translation word of the proper noun candidate to generate a second translated sentence, and
    translates the second translated sentence into the first language based on the proper noun candidate and the translation word of the proper noun candidate to generate a second reverse-translated sentence;
  a display that displays the first reverse-translated sentence and the second reverse-translated sentence;
  an operation unit that receives a user operation of selecting one of the first reverse-translated sentence and the second reverse-translated sentence, and
  a storage unit that stores information,
  wherein the controller, when the user has selected the second reverse-translated sentence, registers the proper noun candidate and the translation word of the proper noun candidate in the registration information.

2. The translation device according to claim 1, wherein the controller generates provisional registration information that associates the proper noun candidate with the translation word of the proper noun candidate, and generates the second translated sentence and the second reverse-translated sentence based on the provisional registration information.

3. The translation device according to claim 1, wherein the controller, when the user has selected the second reverse-translated sentence, causes the display to display a screen for inquiring whether to register the proper noun candidate, and when the controller has received a registration instruction from the user via the operation unit, registers the proper noun candidate and the translation word of the proper noun candidate in the registration information.

4. The translation device according to claim 1, wherein the controller, when the user has selected the first reverse-translated sentence, displays the first translated sentence on the display as a translated sentence of the original sentence, and when the user has selected the second reverse-translated sentence, displays the second translated sentence on the display as a translated sentence of the original sentence.

5. The translation device according to claim 1, wherein the controller acquires the first translated sentence by transmitting the original sentence to an external device having a translation function from the first language to the second language and a translation function from the second language to the first language, and acquires the first reverse-translated sentence by transmitting the first translated sentence to the external device.

6. The translation device according to claim 5,
  wherein the storage unit stores an alternative word dictionary that associates an alternative word in the first language with a translation word of the alternative word in the second language,
  wherein the alternative word and the translation word of the alternative word are translatable by the external device, and
  wherein the controller, when the input unit has received an input of a sentence including the proper noun candidate registered in the registration information, by transmitting an alternative text generated by replacing the proper noun candidate in the sentence with the alternative word to the external device, acquires an alternative translated sentence generated by translating the alternative text into the second language, and generates a translated sentence of the sentence by restoring the translation word of the alternative word in the alternative translated sentence to the translation word of the proper noun candidate.

7. The translation device according to claim 6, wherein the controller, by transmitting the alternative translated sentence to the external device, acquires an alternative reverse-translated sentence generated by translating the alternative translated sentence into the first language, and generates a reverse-translated sentence of the sentence by restoring the alternative word in the alternative reverse-translated sentence to the proper noun candidate.

8. The translation device according to claim 1, wherein the controller extracts the proper noun candidate from the original sentence by analyzing a phrase structure and a word structure of the original sentence.

9. The translation device according to claim 1, wherein the controller divides the proper noun candidate into a plurality of nouns by morphological analysis, and generates a translation word of the proper noun candidate based on a translation word of each of the plurality of nouns in the second language.

10. The translation device according to claim 1, wherein the controller displays one of the first translated sentence and the second translated sentence on the display as a translated sentence of the original sentence, according to the selection of the user.

11. A translation method comprising:
  receiving, by an input unit, an input of an original sentence in a first language;
  acquiring, by an arithmetic unit, a first translated sentence generated by translating the original sentence into a second language and a first reverse-translated sentence generated by translating the first translated sentence into the first language;
  extracting, by the arithmetic unit, a proper noun candidate from the original sentence;
  generating, by the arithmetic unit, a translation word of the proper noun candidate in the second language;
  generating, by the arithmetic unit, a second translated sentence by translating the original sentence into the second language based on the proper noun candidate and the translation word of the proper noun candidate;
  generating, by the arithmetic unit, a second reverse-translated sentence by translating the second translated sentence into the first language based on the proper noun candidate and the translation word of the proper noun candidate;
  displaying, by a display, the first reverse-translated sentence and the second reverse-translated sentence;
  receiving, by an operation unit, a user operation of selecting one of the first reverse-translated sentence and the second reverse-translated sentence; and
  storing registration information in a storage unit;
  wherein, when the user has selected the second reverse-translated sentence, the proper noun candidate and the translation word of the proper noun candidate is registered in the registration information.

12. A non-transitory recording medium storing a program for causing a computer to execute the translation method according to claim 11.

13. The translation method according to claim 11, further comprising displaying one of the first translated sentence and the second translated sentence on the display as a translated sentence of the original sentence, according to the selection of the user.

* * * * *

UNITED STATES PATENT AND TRADEMARK OFFICE
CERTIFICATE OF CORRECTION

PATENT NO. : 11,227,116 B2
APPLICATION NO. : 16/892371
DATED : January 18, 2022
INVENTOR(S) : He Cai et al.

Page 1 of 1

It is certified that error appears in the above-identified patent and that said Letters Patent is hereby corrected as shown below:

On the Title Page

Under "(30) Foreign Application Priority Data," the foreign priority information should be:
(30) Foreign Application Priority Data
Dec. 18, 2017 (JP)......................................................2017-242029

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*